Nov. 24, 1931.  A. H. KROGAN  1,832,989
ENSILAGE HARVESTER
Filed Aug. 31, 1926   5 Sheets-Sheet 1

A. H. KROGAN
Inventor

By C. A. Snow & Co.
Attorneys.

Nov. 24, 1931.　　　A. H. KROGAN　　　1,832,989
ENSILAGE HARVESTER
Filed Aug. 31, 1926　　5 Sheets-Sheet 2
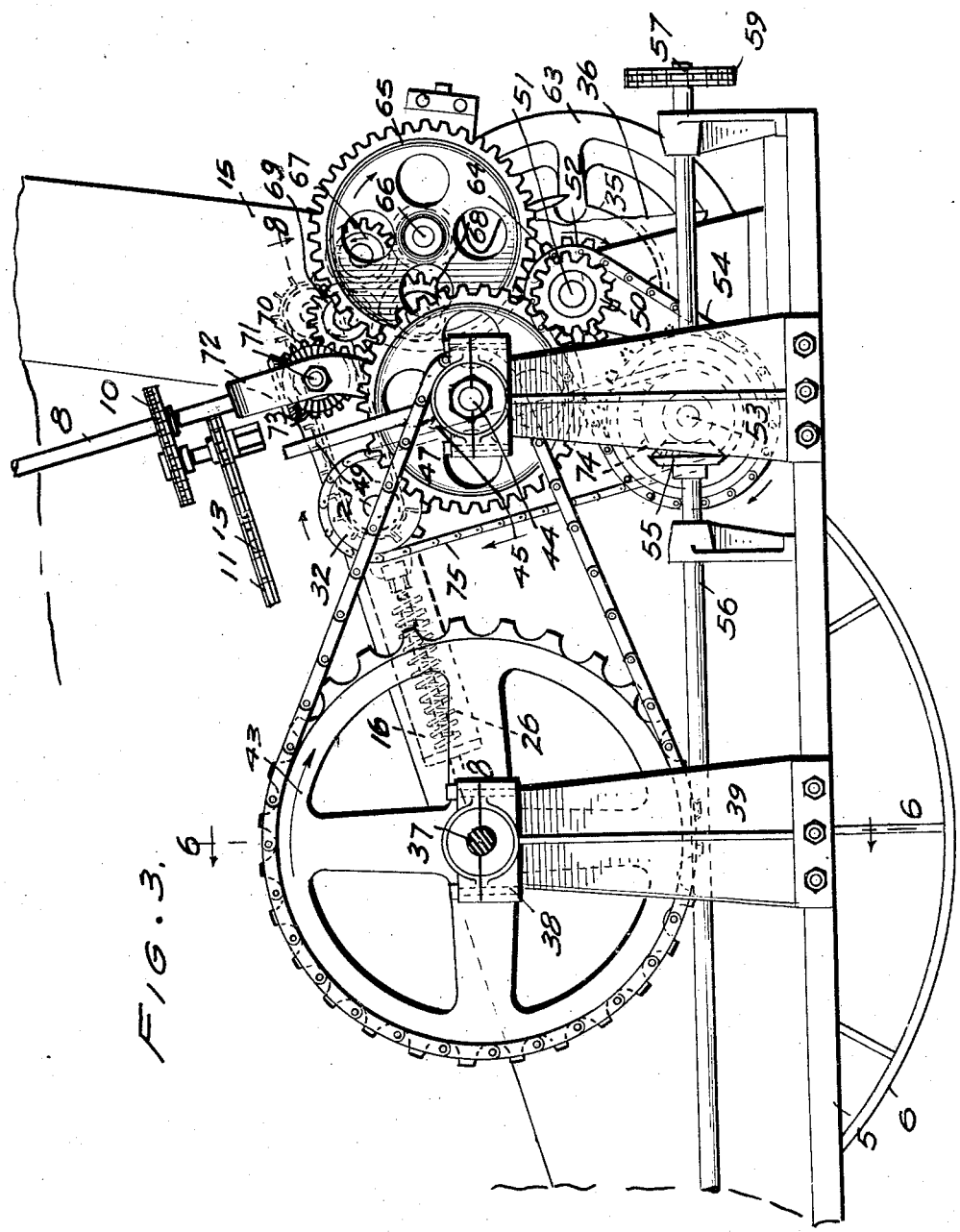
A. H. KROGAN
Inventor
By C. A. Snow & Co.
Attorneys.

Nov. 24, 1931.        A. H. KROGAN        1,832,989
ENSILAGE HARVESTER
Filed Aug. 31, 1926    5 Sheets-Sheet 3
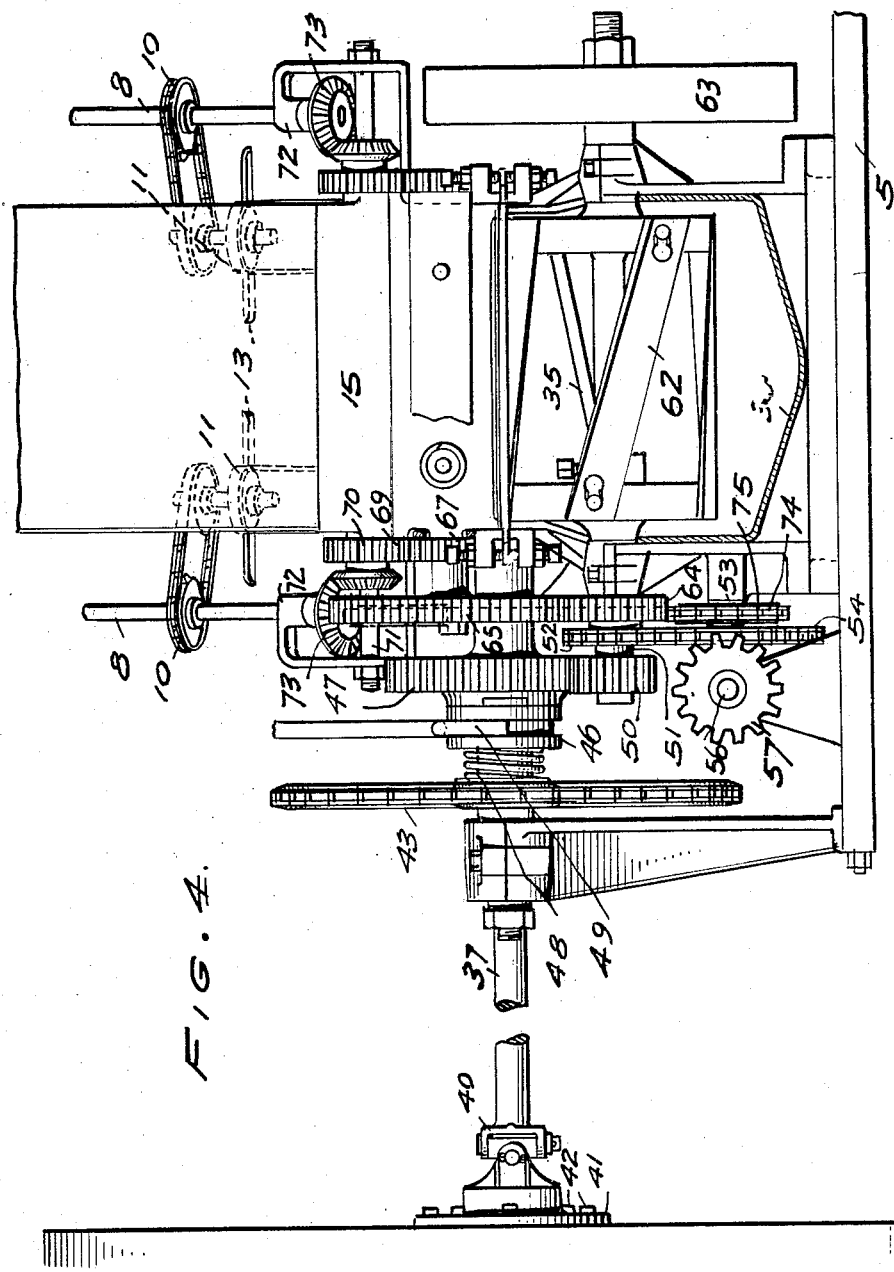

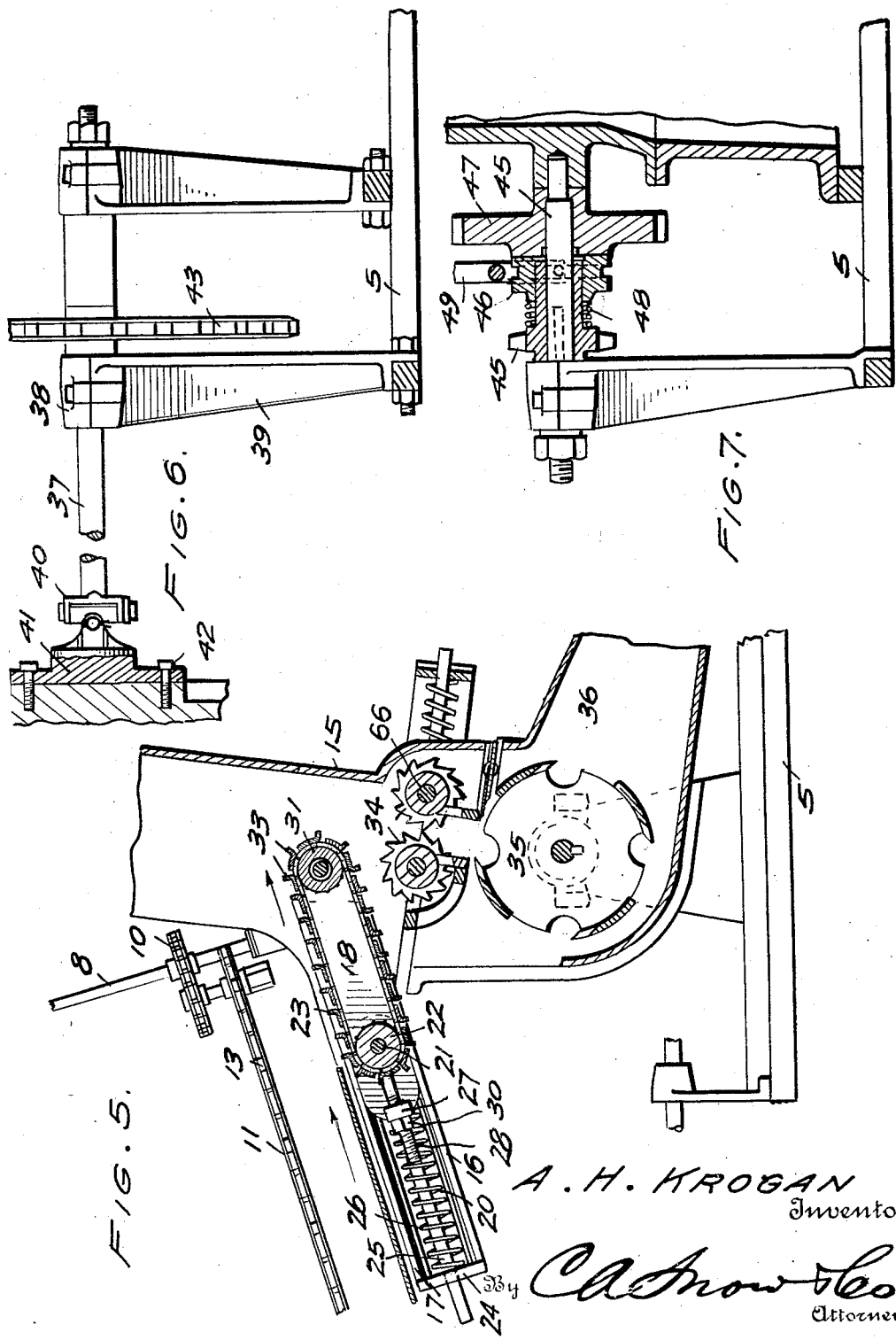

Nov. 24, 1931.  A. H. KROGAN  1,832,989
ENSILAGE HARVESTER
Filed Aug. 31, 1926  5 Sheets-Sheet 5
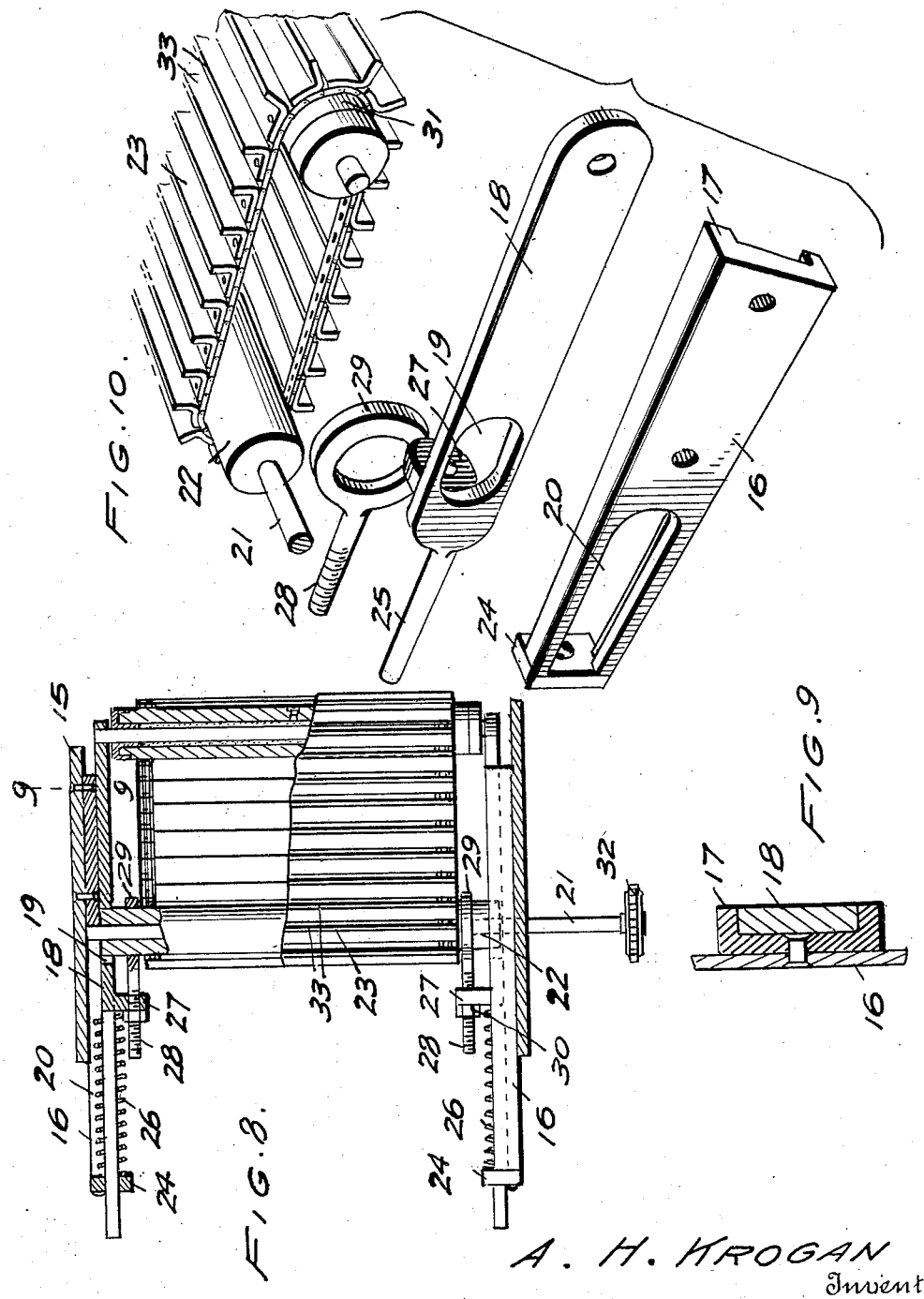
A. H. KROGAN
Inventor
By C. A. Snow & Co.
Attorneys.

Patented Nov. 24, 1931

1,832,989

UNITED STATES PATENT OFFICE

ABNER HENRY KROGAN, OF STANLEY, WISCONSIN

ENSILAGE HARVESTER

Application filed August 31, 1926. Serial No. 132,760.

The present invention has reference to agricultural machines and more particularly to a machine designed for cutting corn stalks standing in the field, novel means being provided for moving the cut stalks into the machine and chopping the same into ensilage lengths.

An important object of the invention is to provide a conveyor of a novel construction, means being provided for supporting the conveyor to cause the conveyor to be forced into the corn stalks or material passed into the machine to insure the material being carried to the feed rollers of the machine.

A still further object of the invention is to provide a machine of this character which may be readily and easily connected with a tractor or similar power device, to the end that the power may be taken from the track for operating the machinery of the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is an enlarged detail view illustrating the gearing for operating the machinery.

Figure 4 is an enlarged plan view of the gearing.

Figure 5 is a sectional view taken on line 5—5 of Figure 2.

Figure 6 is a sectional view taken on line 6—6 of Figure 3.

Figure 7 is a sectional view through the clutch and pinion associated therewith.

Figure 8 is a sectional view taken on line 7—7 of Figure 3.

Figure 9 is a sectional view taken on line 9—9 of Figure 8.

Figure 10 is a view illustrating the various elements of the conveyor forming an important feature of the invention.

Figure 1:
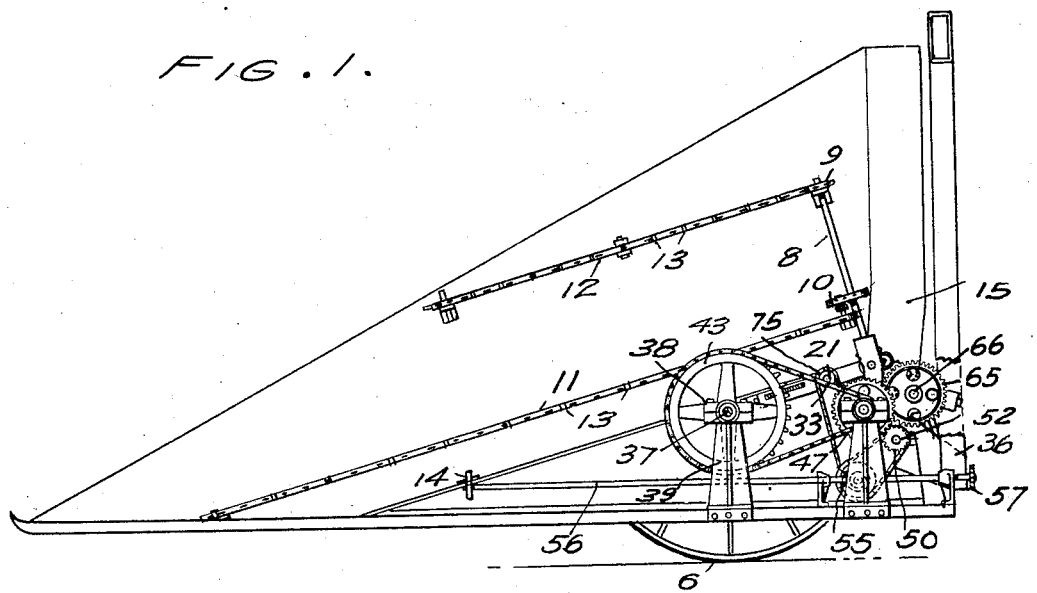
Figure 1 is a side elevational view of a machine constructed in accordance with the invention.
Figure 2:
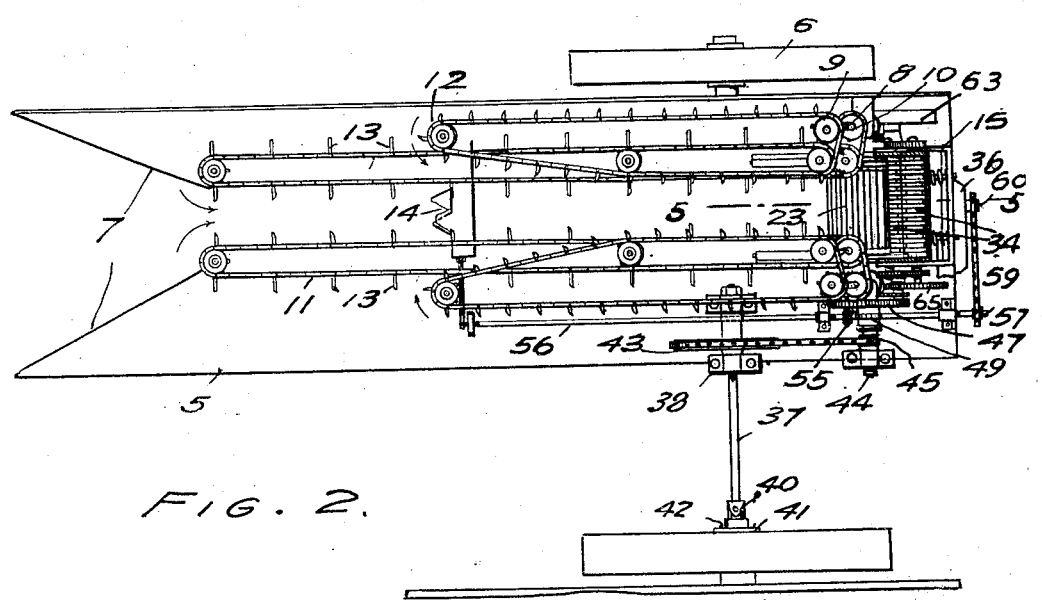
Figure 2 is a plan view thereof showing the same as connected with a suitable power device.

Referring to the drawings in detail, the reference character 5 indicates the platform of the machine, which is wheel-supported, the ground wheel being illustrated by reference character 6.

The platform embodies spaced lateral sections that have their forward ends inclined as at 7 to cause material to be fed between the lateral sections. Inclined shafts 8 are supported adjacent to the rear of the platform and are provided with sprockets 9 and 10 respectively, over which the chains 11 and 12 respectively operate, the chains 11 and 12 being provided with fingers 13 that contact with the standing cornstalks to carry them inwardly between the sections of the base where they are cut by the mower 14 and carried rearwardly for further treatment by the machine.

At the rear of the machine is a vertical casing 15, in which are mounted the guide members 16 which have spaced flanges 17 providing guides for the bearing members 18. Each of these bearing members 18 is formed with an elongated opening 19 adapted to register with the elongated opening 20 of the guide member 16 associated therewith to permit the shaft 21 of the roller 22 on which the conveyor 23 is mounted, to extend therethrough.

At one end of each guide member 16 is an apertured flange 24 through which the stub shaft 25 of the bearing member 18 associated therewith, passes, the stub shafts acting as supports for the coiled springs 26.

An apertured ear 27 is formed on each bearing member 18 and extends laterally therefrom, the ear being designed to receive the threaded extension 28 of the member 29, the member 29 being designed to fit over the roller 22 for purposes to be hereinafter more fully described.

Nuts 30 operate on the threaded portions 28 and bear against the ears 27 so that the roller 22 may be adjusted with respect to the roller 31 of the conveyor 23 to tighten the conveyor or loosen the same as desired.

At the outer end of the shaft 21 is a sprocket 32, that receives motion from a chain passing thereover, which shaft transmits rotary movement to the conveyor 23 to accomplish the purpose of the invention.

From the foregoing construction it will be obvious that the conveyor will be urged forwardly at all times to force the cornstalks or material cut by the machine, rearwardly with such pressure as to insure the material being carried to the feeding rolls.

This conveyor 23 is formed with a plurality of angle bars 33 that extend transversely thereacross, the angle bars defining upstanding blades to contact with the material and carry the material to the vertical casing 15.

Operating directly under the inner extremity of the conveyor 23 are the feed rolls 34 which in turn are mounted directly above the rotary cutter 35, which is supported within one end of the chute 36 to the end that material fed through the rolls 34 will be engaged by the blades of the rotary cutter 35 and cut into ensilage lengths, from where the material will be passed outwardly through the chute 36.

The power shaft of the machine is indicated at 37 and is mounted in the bearing 38 carried at the upper end of the posts 39 supported by the platform 5. One end of the power shaft 37 is provided with a universal joint 40, one portion of the universal joint being provided with a head 41 that is formed with openings to receive securing bolts 42, by means of which the head may be secured to the hub of a suitable power device such as a tractor or the like.

A chain passes from the sprocket 43 mounted on the shaft 37 and imparts rotary movement to the shaft 44 through the medium of the sprocket 45 mounted thereon. The clutch member 46 is splined on the shaft 45 and is normally held into engagement with the pinion 47 by means of the coiled spring 48, there being provided a clutch lever 49 for operating the clutch member 46 to move the same to its inactive position.

The pinion 47 meshes with the pinion 50 as shown by Figure 4 to transmit movement to the shaft 51 on which the pinion 40 is mounted. This shaft 51 also carries a sprocket 52 that transmits motion to the shaft 53 through the medium of the chain 54. As shown, the shaft 53 is supplied with a beveled pinion meshing with the beveled pinion 55 mounted in the horizontal shaft 56 that carries the sprocket 57 at its rear end, which sprocket 57 transmits rotary motion to the sprocket 58, through the medium of the chain 59, which latter sprocket is mounted on shaft 60 that in turn operates suitable mechanism for conveying the ensilage through the chute 36 where it may be deposited in a suitable conveyance, and carried to the silo.

The shaft 51 extends through the casing and provides a support for the rotary cutter 35, there being provided a balance wheel 63 on the outer end of the shaft.

Mounted on the shaft 51 is a gear wheel 64 that meshes with the gear wheel 65 mounted on the outer end of the shaft 66 or shaft on which one of the feed rollers 34 is mounted.

A pinion is carried on the shaft 66 that meshes with the pinion 67 that in turn meshes with pinion 68 mounted on one end of the shaft on which the other feeding roll 34 is mounted, to the end that as the several gears are rotated, the cutter and feeding rolls will be operated simultaneously.

Meshing with the pinion 67 is a pinion 69 that transmits motion to the pinion 70 mounted on the shaft 71 carried in the bracket 72, the pinion 70 having a beveled inner surface meshing with the beveled gear 73 carried at the lower end of the shaft 8 associated therewith, for transmitting rotary movement to the shaft and gathering chains supported thereby.

Power is delivered to shaft 21 through the medium of the chain 75 operating over the sprocket 74 which is carried on shaft 53, as clearly shown by Figure 3 of the drawings.

From the foregoing it will be seen that when a machine of the character described has been coupled to a tractor or similar power device in a manner as set forth by Figure 6 of the drawings, rotary motion will be imparted to the machinery of the attachment, to the end that when the device is moved over a field in which corn stalks are standing, the gathering chains will operate to draw the corn stalks into the mower or cutter 14, from where the cut corn stalks will fall onto the conveyor 23 where the material will be delivered to the feeding rolls 34, the conveyor acting under the tension of the coiled springs 26 will press the corn stalks into close engagement with the wall of the vertical casing and force the material downwardly into the feed rolls 34 which in turn pass the material to the rotary cutter 35 for cutting the stalks into ensilage lengths.

The material so cut is then fed through the chute 36 to a suitable receiving bin or wagon.

It might be further stated that by applying power to the power shaft 37 by means of a power belt or the like from some stationary source of power, the device will be employed as an ensilage cutter.

I claim:

A harvester comprising a frame, a vertical casing mounted on the frame, a conveyor for feeding material to the casing, a horizontal conveyor operating under the first mentioned conveyor, said horizontal conveyor including a pair of rolls having shafts, guide members mounted on the frame, bearing members operating in the guide members and having elongated bearing openings, the shaft of one of the rolls operating in the elongated openings of the bearing members, adjusting members fitted over the ends of one of the rolls, coiled springs for urging the adjusting members in one direction, and means for moving the adjusting members against the tension of the coiled spring.

In testimony that I claim the foregoing as my own, I have hereto affixed my signature.

ABNER HENRY KROGAN.